July 2, 1957 — T. E. CURTIS — 2,798,133
FUSED DROP-OUT CUT-OUTS
Filed Feb. 15, 1956 — 2 Sheets-Sheet 1
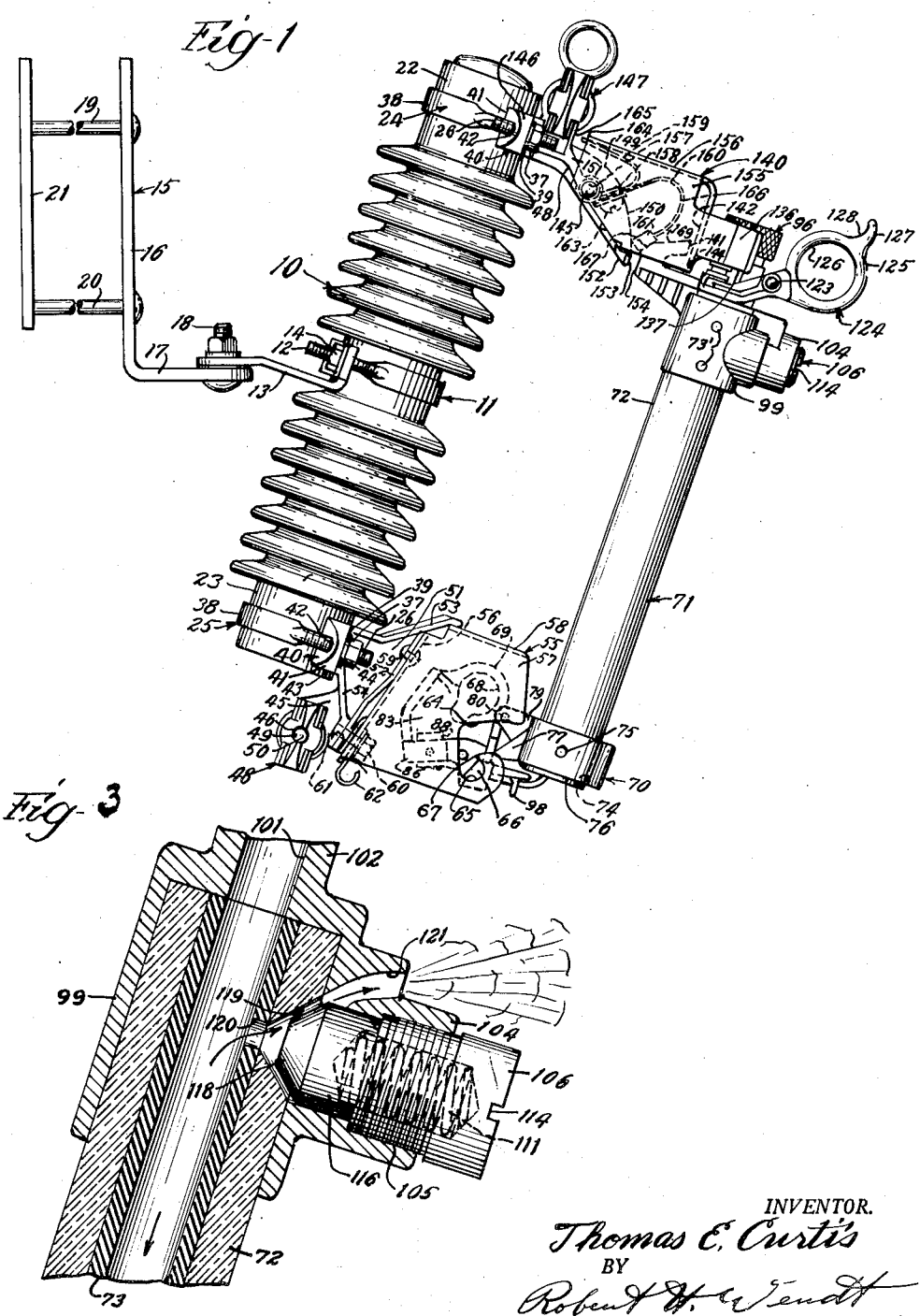
INVENTOR.
Thomas E. Curtis
BY
Robert H. Wendt

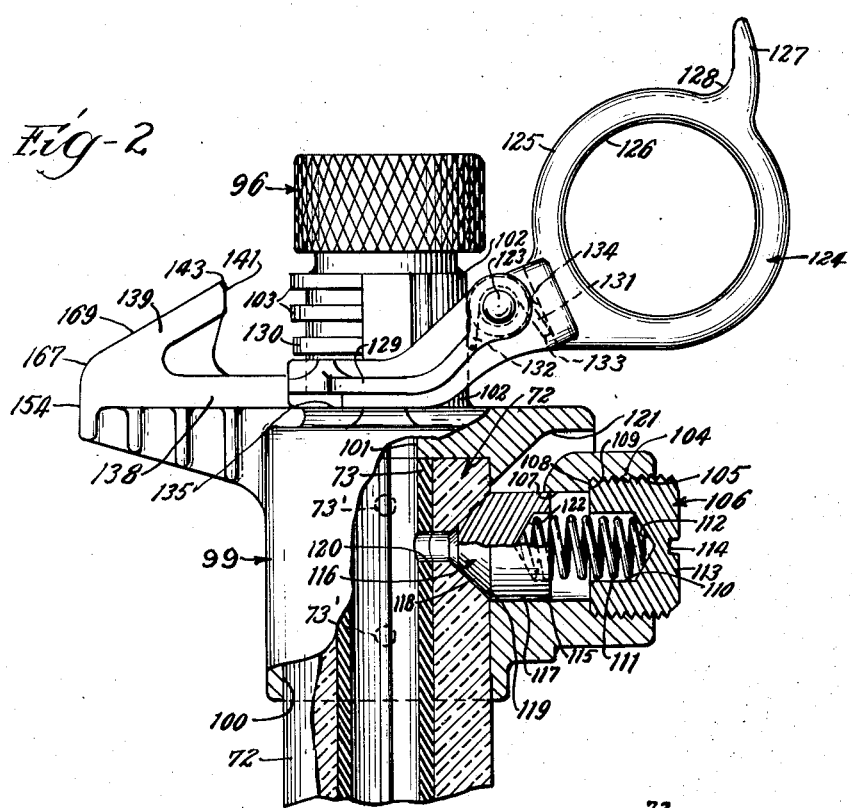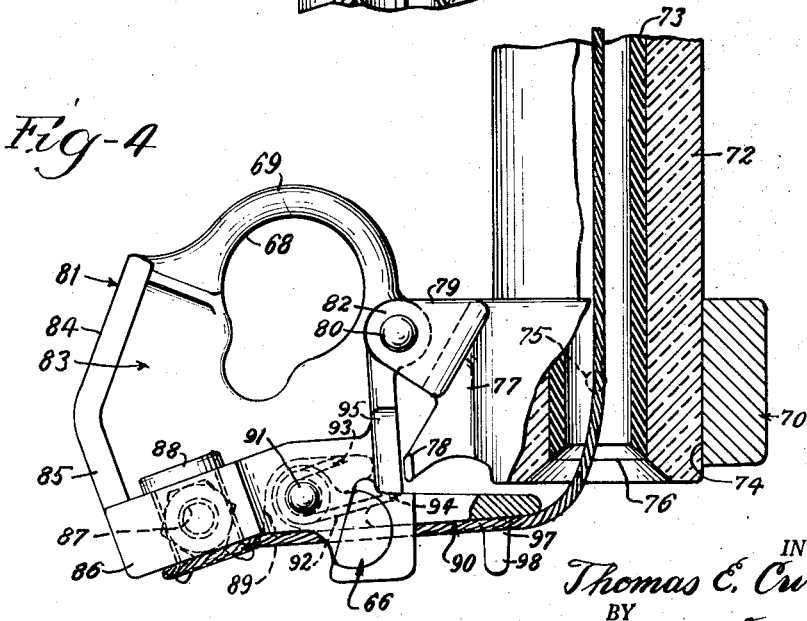

United States Patent Office 2,798,133
Patented July 2, 1957

2,798,133

FUSED DROP-OUT CUT-OUTS

Thomas E. Curtis, Centralia, Mo., assignor to A. B. Chance Company, Centralia, Mo., a corporation of Missouri Application February 15, 1956, Serial No. 565,642

10 Claims. (Cl. 200—127)

The present invention relates to fused drop-out cut-outs, and is particularly concerned with drop-out cut-outs of the type covered by my prior Patent No. 2,721,242, having a pressure relief valve.

One of the objects of the invention is the provision of an improved fused drop-out cut-out having a pressure relief valve in which the structure of the valve and its seat are so arranged that erosion of the sealing surface of the valve or the mating surface of the valve seat is greatly reduced and the automatic operation of the relief valve is assured throughout the long life of the cut-out so that there is no danger of the pressure in the tube reaching a sufficient magnitude to burst the tube or fuse holder.

Another object of the invention is the provision of an improved fused drop-out cut-out of the type having a relief valve, which is simple in construction, which has a minimum number of parts, which has the parts of the relief valve constructed of materials adapted to resist erosion by the gases discharged through the relief valve, and which is adapted to be manufactured very economically so that the cut-outs may be sold to the user at a minimum price.

Another object of the invention is the provision of an improved fused drop-out cut-out of the class described having a relief valve which is automatically self-centering and self-seating after expulsion of gases through the relief valve, and in which the mating surfaces of the valve and the valve seat are so constructed that erosion of these surfaces is greatly reduced in order that the life of the fused cut-out unit may not be diminished by erosion of the sealing surfaces of the relief valve.

Other objects and advantages of the invention will be apparent from the following description and the accompanying drawings, in which similar characters of reference indicate similar parts throughout the several views.

Referring to the drawings, of which there are two sheets,

Fig. 1 is a side elevational view of a fused drop-out cut-out embodying the invention, with the parts in the position which they assume when the cut-out is ready to break the circuit against overloads;

Fig. 2 is a fragmentary sectional view taken through the upper end of the fused tube unit, showing the details of construction of the relief valve, with the valve in the closed position;

Fig. 3 is a view similar to Fig. 3 with the valve in the open position, which it assumes upon the discharge of hot gases, which is caused by the rising of the pressure in the tube to a predetermined value that is determined by the proportions of the relief valve and the characteristics of its spring;

Fig. 4 is a fragmentary sectional view of the lower end of the tube unit showing the position which the parts of the cut-out assume at the time the upper end of the fused tube unit has just been unlatched and is about to pivot downward in a clockwise direction on its lower trunnions;

Referring to Figs. 1 and 2, the fused drop-out cut-out preferably includes an insulator 10, which is carried by a clamping band 11, having a threaded end portion 12 that is secured to a bracket 13, through which it passes, by a nut 14.

The bracket 13 is carried by a cross-arm bracket 15, which includes a right angle member 16, having one flange 17 secured to bracket 13 by a bolt 18, and having the other flange 16 used as a clamping member with two bolts 19, 20, and a plate 21 to clamp the bracket 15 on a cross-arm.

At each of its ends the insulator 10 has a cylindrical supporting surface 22 and 23, which carries a clamping steel band 24, 25, having a threaded end portion 26 serving as a bolt to receive the nut 37. The clamping bands 24 and 25 include the threaded end portion 26 in each case and a flat steel band portion 38, which passes around the insulator and has an aperture in its other end 39 for passing the bolt portion 26.

The bolt 26 in each case supports a clamping casting 40, having its body 41 provided with a through bore 42 for passing the bolt portion 26 of the band; and the body 41 is provided with a through bore for passing the bolt portion 26.

The body 41 has a curved surface 43 for engaging the cylindrical part 23 of the insulator; and the bore 42 extends substantially tangentially and terminates at a plane surface 44, which has the bore 42 for passing the bolt portion 26, which is secured by nut 37 bearing against the end portion 39.

The casting 40 has an integral extension 45, which is provided with an aperture 46 for passing the threaded bolt portion 50 of an electrical connector 48. The connector 48 has an elongated head; and its bolt portion has a through bore 49 for passing an electrical conductor which is clamped in place by a nut on the bolt portion 50.

The casting 40 has a forwardly extending web 51, which carries an integral forward attaching flange 52, an upper diagonal border flange 53, and a lower diagonal border flange 54 integrally joined at the corners. The attaching flange 52 supports a metal hood 55, comprising a rear wall 56, a pair of side walls 57, and a top wall 58.

The hood 55 is open at the bottom and right side and has its rear wall secured to the attaching flange 52 by rivets 59 and by a threaded screw bolt 60 threaded into a threaded bore 61. Screw bolt 60 supports a partially cylindrical bumper spring 62, through which the bolt passes; and it also supports the lower contact spring assembly, extending forwardly through an aperture into the hood 55.

At their forward edges the side walls 57 of the hood 55 are provided with inwardly extending slots 64, which may be identical in shape, and which are forwardly open and downwardly curved, terminating in the partially cylindrical trunnion bearings 65 for receiving the half cylindrical trunnions 66 of the fuse tube unit 71.

The slot 64 is forwardly open so that the trunnions 66 may be inserted while the fuse tube unit 71 is hanging downward and the trunnion bearings 65 are upwardly open into the slot 64 so as to retain the trunnions 66 and permit their entry into the bearings 65 only when the half cylindrical trunnions 66 have their narrowest dimension extending in the direction of the opening between the point 67 and the rear wall of slot 64.

In other words, the trunnions 66 are diametrically too wide to pass this narrow opening at the point 67, except when the half diameter of the trunnion is so disposed that the narrowest dimension of the trunnion is presented in the direction of movement through the narrow opening at 67.

This is the case when the fuse tube unit 71 is extending downward from the trunnions 66, as it is during its installation in the hood 55, at which time it is supported by a laterally extending headed lug on the end of a fuse stick having its lug in the aperture 68 of the ring 69 on the lower fixture 70 of the fuse tube unit 71.

The restriction at the point 67 in the slot 64 cooperates with the half cylindrical trunnions 66 in holding these trunnions in their bearings 65 against upward movement of the fuse tube unit, which might be caused by the expulsion of gases from the open lower end of the fuse tube.

The fuse tube unit 71 includes an insulating cylindrical tube 72, having a special insulating liner 73 adapted to resist erosion and gaseous pressure; and the tube 72 passes through a cylindrical bore 74 in the lower fixture 70 of the tube unit, where the parts are secured by a plurality of drive screws 75.

The fuse tube 72 is open at its lower end 76. The opening is belled out to a frusto-conical form. The lower fuse tube fixture 70 includes an integral rearward extension 77, supporting a transversely extending stop flange 78; and it also includes a bifurcated hinge extension 79, having a through bore for passing the hinge rivet 80.

The trunnions 66 are carried by a trunnion casting 81, having a hinge flange 82 pivotally mounted on the rivet 80 between the twin flanges of the bifurcated hinge formation 82. The hinge pivot 80 is located above and toward the right of the trunnions 66 so that the weight of the fuse tube unit tends to cause the trunnion casting 81 to pivot clockwise on the fuse tube unit; but this pivotal movement is resisted by the fuse and fuse leader, which hold the trunnion casting 81 against the stop flange 78 until the fuse blows.

The trunnion casting 81 has a central web 83 within which is formed the keyhole aperture 68 of ring 69; and the web 83 supports a rear contact flange 84 for engagement with the contact spring 63.

The border flange 85 on web 83 extends downwardly and toward the right so that it will engage the bumper 62 at the proper time in the opening of the cut-out to permit the trunnion casing 81 to pivot clockwise on the trunnions 66.

At its lower edge the trunnion casting 81 has a thickened wall portion 86 provided with a threaded bore 87 for receiving the threaded clamping member 88, which clamps the end of the fuse leader to the casting 81.

The trunnions 66 extend in opposite directions from both sides of the trunnion casting 81, which has a hinge slot 89 between the trunnions for receiving the fuse throw-out lever 90 that is pivoted on rivet 91 in the slot 89. A coil spring 92 is wrapped around the rivet 91 and has one end 93 bearing against the wall of slot 89 and the other end 94 bearing against the lower edge of a stop flange 95 located on the trunnion casting 81 in position to engage stop 78 and also to engage throw-out lever 90.

At its upper end the fuse tube may be closed either by an internally threaded cap or an externally threaded plug 96.

Throw-out lever 90 is biased by spring 92 in a clockwise direction, tending to pull the fuse out of the fuse tube. The fuse is of the usual type, having an upper button secured and clamped by the threaded cap 96, and having a fuse located in the upper end of tube 72, and provided with a flexible cable serving as a leader and extending out of the lower end of the tube.

At the lower end of the tube the leader extends to the left through a slot or groove 97 between lugs 98 on throw-out lever 90 and extends to the clamping member 88, where the leader is secured to the trunnion casting 81, holding the throw-out lever 90 and the trunnion casting 81 in the position shown in Fig. 2.

At its upper end the fuse tube 72 is provided with the top tube casting 99, having a bore 100 for receiving the insulating tube 72, which is secured in place by the drive screws 73'. The bore 100 communicates with a smaller counterbore 101 in the upper extension 102 of the top casting, which carries a plurality of radially extending ribs 103 and is internally threaded to receive the cap 96.

The top casting 99 is provided with a lateral tubular extension 104 (Fig. 3), having internal threads 105 for receiving the valve plug 106, which is externally threaded at its inner end. The threaded bore 105 communicates with a cylindrical bore 107 fitting the inner cylindrical end 108 of the valve plug 106, which is seated against an annular shoulder 109.

The valve plug 106 has an internal axial bore 110 for receiving a helical compression spring 111, which may be seated against the end 112 of the bore in the closed end 113 of the plug.

The valve plug 106 preferably has a slot 114 for receiving a screwdriver or other tool. The top casting 99 has a counterbore 115 extending to the tube 72 and adapted to receive the valve member 116, which is provided with a cylindrical outer surface 117 of smaller diameter. Valve member 116 has a frusto-conical seating surface 118, engaging a complementary frusto-conical surface 119 in the side of the tube 72. This communicates with a cylindrical aperture 120 through the tube lining 73.

The valve member 116 is preferably molded out of initially plastic, nonmetallic fiber of similar characteristics to the material of the liner 73. As the seat 119 is also fibrous insulation, the valve 116 and its seat are both adapted to resist erosion by the heated gases.

From the cylindrical bore 115 a diagonal vent 121 extends diagonally upward and toward the right, terminating above the tubular extension 104. The upper wall of the vent 121 forms a continuation of the valve seat 119 and is adapted to discharge gases outwardly and upwardly toward the right when the gaseous pressure in the tube exceeds a predetermined value.

The valve member 116 is provided with an internal bore 122 at its rear side; and the bore 122 is adapted to receive and seat the left end of compression spring 111.

The length and pressure of this spring is so proportioned that a predetermined amount of gaseous pressure is attained in the tube before the valve member 116 is caused to move to the right to open the vent 121. This pressure permits the gas to escape from the upper port 121, as well as the lower end opening 76 of the tube, to prevent the pressure from reaching a value that would burst the tube.

As the valve member 116 is mounted loosely in the cylindrical bore 115, it is adapted to find its own central position on the seat 119 by the action of the two frusto-conical surfaces 118 and 119. The tapered valve end automatically finds the center of the tapered valve seat.

The top casting 99 at its upper extension 102 supports a radially extending hinge flange having a bore for receiving the rivet 123 for pivotally mounting the pry-out top lever 124. This top pry-out lever 124 is formed with a ring 125, having a circular aperture 126 for receiving the lug of a switch stick; and it is preferably formed with an upwardly extending hook 127, forming a groove 128, permitting the switch stick to pull by engaging the top of the surface 128, if desired.

At its opposite end the pry-out lever 124 has two partially circular curved arms 129, which curve about the extension 102 of the fuse tube casting 99, and are located beneath the jaws 136 of the upper hood to engage the lower surfaces 137 of these jaws.

A coil spring 131 is wrapped around the rivet 123 and has one end 132 bearing against the extension 102 and the other end 133 bearing against the surface 134 on the pry-out.

This spring is so tensioned that it urges the pry-out lever 124 in a clockwise direction, holding it down against the annular shoulders 135 on the top casting 99. The top casting 99 of the fuse tube unit 71 has a hooked extension 138, provided with an upwardly extending latching member 139 that extends inside the upper hood 140 and has a latching surface 141 engaging behind the front wall 142 of the hood. The latching surface 141 terminates at 143 at its upper edge; and the front wall 142 terminates at 144.

In the release of the upper end of the fuse tube unit 71 the corner 143 must move down far enough to clear the lower edge 144 of the front wall 142 of hood 140. This can be accomplished in two ways. The fuse tube unit 71 may move downward when the fuse blows, thus effecting a release of the upper end of the fuse tube unit at the latching surfaces 141, 144.

Another way in which the upper end of the fuse tube unit may be released is by the counterclockwise pivotal movement of hood 140 on rivet pin 145. For this purpose hood 140 and its associated parts are constructed as follows:

The upper cylindrical end 22 of insulator 10 carries a clamping band 24 with its threaded bolt extension 26. Bolt extension 26 passes through the casting body 146, which also carries the connector 147, similar to that previously described.

The casting body 146 carries a forward extension 148, including a pair of webs 149, 150 and reinforcing ribs 151, 152, terminating in a bumper 153, limiting the motion of the tube unit into the hood 140 by engagement with surface 154.

Ribs 151, 152 are wide enough to hit the side walls 155 of hood 140, which has the top wall 156 and the front wall 142, previously described.

Body 146 and forward extension 149 have the through bore 157 for passing the rivet 145, which also passes through the side walls 155 of the hood, pivotally mounting the hood on the extension 149. The extension 149 has the forward attaching surface 158 to which are secured a pair of springs 159 for urging the hood clockwise and 160 for supporting the upper contact 161. Both these springs 159 and 160 have a through aperture for passing the screw bolt 163, which secures them against the surface 158.

Spring 159 is bent backwardly and engages under the top wall 156 of the hood at the point 164, urging the hood in a clockwise direction. There is a suitable clearance between the top wall 156 and the extension 149 to permit the hood to move pivotally; but its motion is limited by the engagement of the hood with the connector at 165.

The contact supporting springs 160 are doubled for strength and are curved to U shape at 166 and carry the contact 161 at the lower end of the outer leg. Contact 161 is adapted to engage the tube unit at the surface 167 just inside the hood.

The hood 140 has a pair of diverging clip flanges 136 extending forwardly from each side wall 155 on each side of the front wall 142. These clip flanges 136 are adapted to engage on the opposite sides of the cap 96 for holding the fuse tube unit 71 against lateral movement when it is latched to the upper hood at the surfaces 141 and 142.

The operation of the fuse tube unit for releasing the upper end manually is as follows: A downward pull on the prying lever 124 causes its other end portions 129 to engage the lower edges 137 of the clips 136, lifting the hood 140 and causing it to pivot counterclockwise on the rivet 145.

When the hood has been lifted sufficiently for the corner 143 of the latch surface 141 to clear the lower edge 144 of the front wall 142 of the hood 140, the downward pull, which has been exerted on the prying lever, pulls the fuse tube unit forward at its upper end, causing it to pivot on the trunnions 66 in a clockwise direction until the fuse tube unit may hang downwardly from the lower hood 55.

The manual closing movement of the face tube unit with the upper hood is accomplished by using the upper ring 125 with a fuse stick and pivoting the fuse tube unit 71 upward counterclockwise until the camming surface 169 on the upper casting 99 moves the hood up until it snaps down again behind the surface 144.

The operation of the fused drop-out cut-out upon overload caused by excessive current sufficient to blow the fuse is as follows: When the fuse melts, the tension which is placed upon the fuse and fuse leader by the throw-out lever 90 and its spring 92 causes this throw-out lever to pull the fuse leader of the tube 72.

The melting of the fuse forms explosive gases, which are discharged out of the lower end of the tube 72, also expelling the fuse leader. The release of the tension of the fuse leader on the throw-out arm 90 permits the spring 92 to move this throw-out lever in a clockwise direction.

The release of the tension that is placed on the casting 81 by the fuse and fuse leader, which hold the casting against the stop 78, permits the weight of the fuse tube unit to act downwardly on casting 81 at pivot 80; and casting 81 rotates on trunnions 66 in a clockwise direction, permitting the rivet 80 to move in an arc downward toward the right.

This causes tube 72 to move downward until its upper latching surface 141 clears the end 144 of the front wall 142 of hood 140. The pressure of the contact spring then urges the fuse tube unit in a clockwise direction, pivoting on its lower trunnions, and releasing it from the upper hood 140 until the fuse tube unit hangs downward from the trunnions 66, indicating that the fuse has blown.

When the fuse blows, if the gases do not attain a pressure that is dangerous to the structure of the tube 72, the valve 116, which closes the upper vent 121, does not open. If the overload is such as to cause excessive gas pressure beyond a predetermined value, which might burst the tube, the upper valve 116 opens; and gas is discharged from both ends of the tube.

The present valve seat and valve structure and arrangement are such that the upper gases are vented substantially without erosion of the valve or its seat, thus eliminating one of the defects of the prior art devices.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring and said extension being formed with a relief aperture extending out of said fixture in a lateral direction from said valve seat opening to discharge the gases from said tube with the gaseous pressure reaching a predetermined value dependent upon the size of the valve and the spring pressure.

2. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring and said extension being formed with a relief aperture extending out of said fixture in a lateral direction from said valve seat opening to discharge the gases from said tube with the gaseous pressure reaching a predetermined value dependent upon the size of the valve and the spring pressure, said valve seat opening being frusto-conical in shape and tapering inwardly and said valve seat having a complementary surface engaging the valve seat opening and automatically centering the valve member against the valve seat opening.

3. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring and said extension being formed with a relief aperture extending out of said fixture in a lateral direction from said valve seat opening to discharge the gases from said tube with the gaseous pressure reaching a predetermined value dependent upon the size of the valve and the spring pressure, said valve seat opening being frusto-conical in shape and tapering inwardly and said valve seat having a complementary surface engaging the valve seat opening and automatically centering the valve member against the valve seat opening, said valve member being provided with a socket for receiving the end of the spring and said plug having an oppositely directed socket for housing the other end of the spring, said bore having a clearance with regard to said valve member to permit the valve member to shift laterally to find its seat on the tapered valve opening surface.

4. In a fused drop-out cut-out the combination of a supporting insulator with upper and lower tube fuse supporting arms carried thereby, said upper arm including an extension supporting a hood which is downwardly open and provided with a latching surface on its forward wall, said hood being pivotally mounted on said extension, said lower arm being provided with a hood fixedly mounted thereon and having forwardly open slots in its side walls, said slots extending downwardly and terminating in partially cylindrical portions which open upward and which form bearings for trunnions, a fuse tube unit comprising an insulating tube provided with upper and lower metal fixtures, the said lower fixture carrying a laterally extending trunnion adapted to be inserted in said trunnion bearings, the said upper fixture being provided with a rearwardly and upwardly extending latching member for engaging behind the forward wall of the upper hood, said upper fixture comprising a cylindrical body mounted on said insulating tube and formed with a lateral tubular extension having a through bore, said bore extending to said insulating tube and said insulating tube being formed with a frusto-conical extension of said bore providing a valve seat, said valve seat having a central aperture extending to the interior of said tube, a threaded plug in the outer end of said tubular extension, a spring engaged by said threaded plug and a non-metallic fibrous valve member of cylindrical shape engaged by said spring and having a frusto-conical seat engaging surface for closing said bore, said bore in said tubular extension communicating with an outwardly extending vent for discharging gases from said tube when said valve is moved outwardly, the valve being adapted to vent the gases from the upper end of said tube when the gaseous pressure exceeds a predetermined amount.

5. In a fused drop-out cut-out the combination of a supporting insulator with upper and lower tube fuse supporting arms carried thereby, said upper arm including an extension supporting a hood which is downwardly open and provided with a latching surface on its forward wall, said hood being pivotally mounted on said extension, said lower arm being provided with a hood fixedly mounted thereon and having forwardly open slots in its side walls, said slots extending downwardly and terminating in partially cylindrical portions which open upward and which form bearings for trunnions, a fuse tube unit comprising an insulating tube provided with upper and lower metal fixtures, the said lower fixture carrying a laterally extending trunnion adapted to be inserted in said trunnion bearings, the said upper fixture being provided with a rearwardly and upwardly extending latching member for engaging behind the forward wall of the upper hood, said upper fixture comprising a cylindrical body mounted on said insulating tube and formed with a lateral tubular extension having a through bore, said bore extending to said insulating tube and said insulating tube being formed with a frusto-conical extension of said bore providing a valve seat, said valve seat having a central aperture extending to the interior of said tube, a threaded plug in the outer end of said tubular extension, a spring engaged by said threaded plug and a non-metallic fibrous valve member of cylindrical shape engaged by said spring and having a frusto-conical seat engaging surface for closing said bore, said bore in said tubular extension communicating with an outwardly extending vent for discharging gases from said tube when said valve is moved outwardly, the valve being adapted to vent the gases from the upper end of said tube when the gaseous pressure exceeds a predetermined amount, the said upper fixture being provided with a pivoted lever having an extension for engagement with a switch stick, said pivoted lever having its opposite end located to engage beneath said upper hood to lift the hood out of latching engagement with the upper fixture to release the upper end of the fuse tube unit.

6. In a fused drop-out cut-out the combination of a supporting insulator with upper and lower tube fuse supporting arms carried thereby, said upper arm including an extension supporting a hood which is downwardly open and provided with a latching surface on its forward wall, said hood being pivotally mounted on said extension, said lower arm being provided with a hood fixedly mounted thereon and having forwardly open slots in its side walls, said slots extending downwardly and terminating in partially cylindrical portions which open upward and which form bearings for trunnions, a fuse tube unit comprising an insulating tube provided with upper and lower metal fixtures, the said lower fixture carrying a laterally extending trunnion adapted to be inserted in said trunnion bearings, the said upper fixture being provided with a rearwardly and upwardly extending latching member for engaging behind the forward wall of the upper hood, said upper fixture comprising a cylindrical body mounted on said insulating tube and formed with a lateral tubular extension having a through bore, said bore extending to said insulating tube and said insulating tube being formed with a frusto-conical extension of said bore providing a valve seat, said valve seat having a central aperture extending to the interior of said tube, a threaded plug in the outer end of said tubular extension, a spring engaged by said threaded plug and a non-metallic fibrous valve member of cylindrical shape engaged by said spring and having a frusto-conical seat engaging surface for closing said bore, said bore in said tubular extension communicating with an outwardly extending vent for discharging gases from said tube when said valve is moved outwardly, the valve being adapted to vent the gases from the upper end of said tube when the gaseous pressure exceeds a predetermined amount, the said upper fixture being provided with a pivoted lever having an extension for engagement with a switch stick, said pivoted lever having its opposite end located to engage beneath said upper hood to lift the hood out of latching engagement with the upper fixture to release the upper end of the fuse tube unit, said lower fixture on the fuse tube unit being provided with a pivoted member provided on said lower fixture above and outwardly of said trunnions and being adapted to pivot upward and outward to permit the fuse tube unit to move downward, said fuse tube unit containing a fuse having a leader extension and the leader extension extending about the end of a throw-out lever and being secured to said pivot member to hold the pivotal member against pivotal member except when the fuse blows and releases its leader.

7. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring, and said extension being formed with a relief aperture extending out of said fixture in a lateral direction from said valve seat opening to discharge the gases from said tube with the gaseous pressure reaching a predetermined value, dependent upon the size of the valve and the spring pressure, said fuse tube unit including an outer insulating tube and an inner insulating lining, and said frusto-conical seat being located in the wall of said outer insulating tube and communicating with a cylindrical bore passing through the remainder of the outer tube and through the inner tube.

8. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring, and said extension being formed with a relief aperture extending out of said fixture in a lateral direction from said valve seat opening to discharge the gases from said tube with the gaseous pressure reaching a predetermined value, dependent upon the size of the valve and the spring pressure, said fuse tube unit including an outer insulating tube and an inner insulating lining, and said frusto-conical seat being located in the wall of said outer insulating tube and communicating with a cylindrical bore passing through the remainder of the outer tube and through the inner tube, said valve seat opening being frusto-conical in shape and tapering inwardly, and said valve having a complementary surface engaging the valve seat opening and automatically centering the valve member against the valve seat opening.

9. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring, and said extension being formed with a relief aperture extending out of said fixture in a lateral direction from said valve seat opening to discharge the gases from said tube with the gaseous pressure reaching a predetermined value, dependent upon the size of the valve and the spring pressure, said fuse tube unit including an outer insulating tube and an inner insulating lining, and said frusto-conical seat being located in the wall of said outer insulating tube and communicating with a cylindrical bore passing through the remainder of the outer tube and through the inner tube, said valve seat opening being frusto-conical in shape and tapering inwardly, and said valve having a complementary surface engaging the valve seat opening and automatically centering the valve member against the valve seat opening, said relief aperture comprising a curved conduit having an outer laterally directed port, and having an inner larger port which is covered by said valve member.

10. In a fused drop-out cut-out, a fuse tube unit comprising an elongated insulating tube open at the bottom and provided at its upper end with a metal fixture surrounding the tube and secured thereto and having a threaded bore for a cap, said bore having a counterbore for receiving a button carried by a fuse having a leader extension extending out of the lower end of said tube, said upper fixture being formed with a lateral tubular extension having a bore extending to said insulating tube, said bore being threaded at its outer end and provided with a threaded plug secured therein, a spring seated against said plug and a valve member of non-metallic insulating material engaged by the other end of said spring, said tube being formed with a valve seat opening communicating with said bore and with a central smaller bore extending from said opening to the interior of said tube, said valve seating against said valve opening to close the same under pressure of said spring, and said extension being formed with a relief aperture extending out of said fixture in a lateral direction from said valve seat opening to discharge the gases from said tube with the gaseous pressure reaching a predetermined value, dependent upon the size of the valve and the spring pressure, said fuse tube unit including an outer insulating tube and an inner insulating lining, and said frusto-conical seat being located in the wall of said outer insulating tube and communicating with a cylindrical bore passing through the remainder of the outer tube and through the inner tube, said valve seat opening being frusto-conical in shape and tapering inwardly, and said valve having a complementary surface engaging the valve seat opening and automatically centering the valve member against the valve seat opening, said relief aperture comprising a curved conduit having an outer laterally directed port, and having an inner larger port which is covered by said valve member, said inner port having its wall which is toward the valve seat opening located to present no obstruction to the gases passing over the valve seat.

References Cited in the file of this patent

UNITED STATES PATENTS

| | | |
|---|---|---|
| 2,109,090 | Pittman et al. | Feb. 22, 1938 |
| 2,721,242 | Curtis et al. | Oct. 8, 1955 |